United States Patent [19]

Benier

[11] 4,191,519
[45] Mar. 4, 1980

[54] DOUGH-ROUNDING MACHINE

[75] Inventor: Johan Benier, 's-Hertogenbosch, Netherlands

[73] Assignee: Benier B.V., 's-Hertogenbosch, Netherlands

[21] Appl. No.: 863,606

[22] Filed: Dec. 23, 1977

Related U.S. Application Data

[63] Continuation-in-part of Ser. No. 767,978, Feb. 11, 1977, abandoned.

[30] Foreign Application Priority Data

Feb. 19, 1976 [NL] Netherlands ..................... 7601680

[51] Int. Cl.² ........................................... A21C 1/00
[52] U.S. Cl. .................................................... 425/332
[58] Field of Search ......................................... 425/332

[56] References Cited

U.S. PATENT DOCUMENTS

| | | | |
|---|---|---|---|
| 528,886 | 11/1894 | Mishler | 425/332 |
| 793,155 | 6/1905 | Piper | 425/332 |
| 1,067,953 | 7/1913 | Van Houten, Jr. | 425/332 |
| 1,948,870 | 2/1934 | Pointon et al. | 425/332 |

FOREIGN PATENT DOCUMENTS

| | | | |
|---|---|---|---|
| 230820 | 12/1963 | Austria | 425/332 |
| 169482 | 11/1901 | Fed. Rep. of Germany | 425/332 |
| 666847 | 10/1938 | Fed. Rep. of Germany | 425/332 |
| 59051 | 12/1967 | German Democratic Rep. | 425/332 |
| 331193 | 10/1935 | Italy | 425/332 |

*Primary Examiner*—William R. Briggs
*Attorney, Agent, or Firm*—Brumbaugh, Graves, Donohue & Raymond

[57] ABSTRACT

A dough-rounding machine, including a substantially horizontal trough defined by a carrying surface at the bottom and a pair of dough kneading plates which diverge upwardly from the carrying surface to form the sidewalls of the trough, has a drive mechanism designed to reciprocate the kneading plates in opposite directions laterally and longitudinally of the trough. The carrying surface may be movable in the longitudinal direction of the trough to advance a piece of dough through the machine.

10 Claims, 3 Drawing Figures

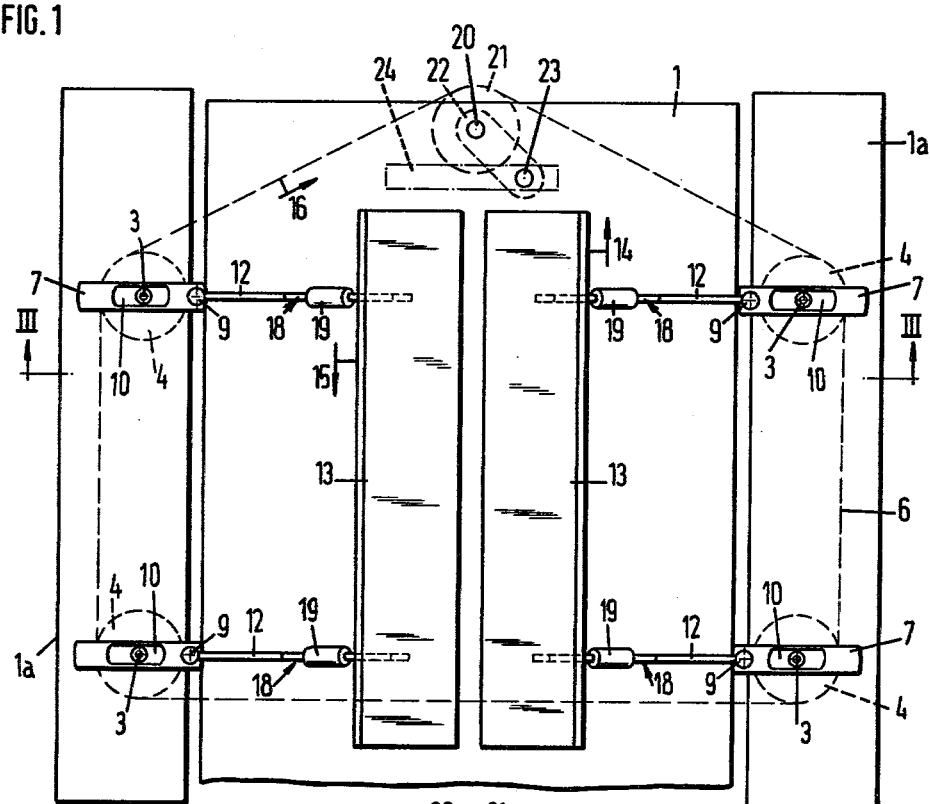
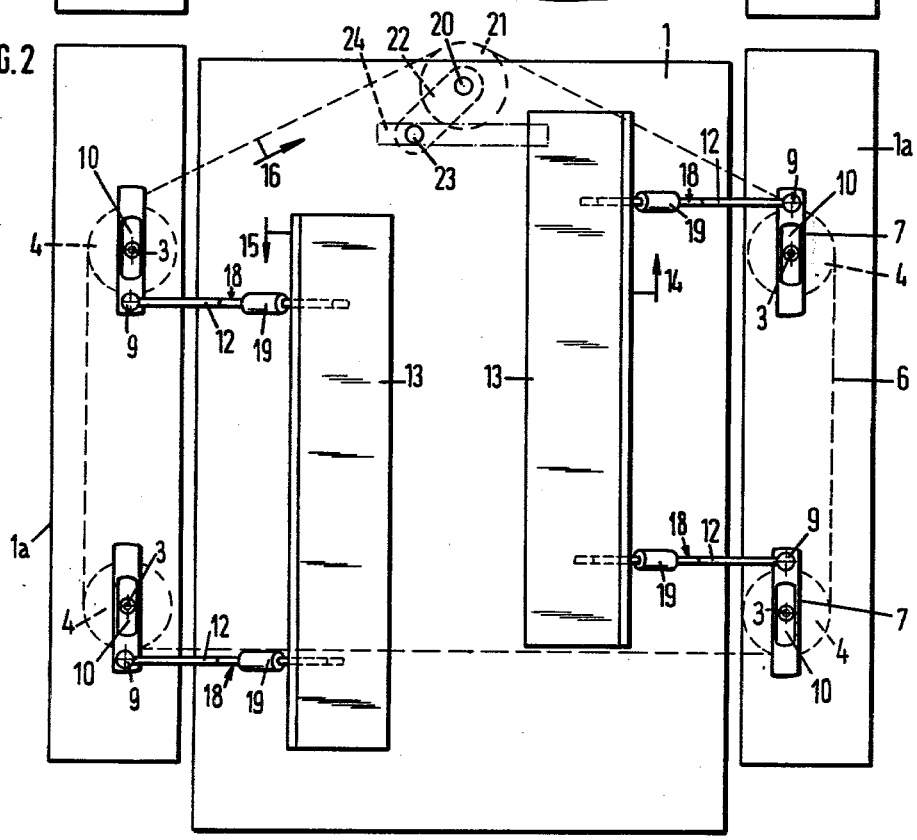

DOUGH-ROUNDING MACHINE

CROSS REFERENCE TO RELATED APPLICATION

This is a continuation-in-part of application Ser. No. 767,978, filed Feb. 11, 1977 now abandoned.

FIELD OF THE INVENTION

The present invention relates to a machine for rounding or kneading pieces of dough, and, more particularly, to a dough-rounding machine comprising kneading surfaces defining a substantially horizontal trough having sidewalls diverging upwardly from a carrying surface, at least one kneading surface being movable with components of movement in the longitudinal direction of the trough.

BACKGROUND OF THE INVENTION

In German Patent No. 169,482, there is a disclosure of a dough-rounding machine in which kneading surfaces are formed by the facing runs of a pair of oppositely movable endless belts. Because the kneading surfaces diverge upwardly, they are able to process pieces of dough of different sizes. By running the belts in opposite directions, the pieces of dough are rotated about an axis which, owing to a small difference in the velocity of the belts, is gradually moved in a direction of advance to the delivery end of the belts. By appropriately selecting the difference in velocity of the belts, the number of revolutions of the pieces of dough during their period of residence between the belts may be adjusted so that the pieces can be subjected to a large number of kneading operations in a machine of short length and so that a plurality of pieces can be simultaneously treated in narrowly-spaced relationship. The kneading surfaces primarily deform the bottom part of the pieces of dough, whereby a taut skin is formed at the top, which causes the rounded dough pieces to maintain a spherical form during the subsequent rising process.

SUMMARY OF THE INVENTION

Many of the problems and shortcomings of known dough-rounding machines are overcome by the present invention which provides a new and improved dough-rounding machine that gives superior results, has improved adjustability, and is easier to clean and maintain.

The machine according to the present invention is characterized by means for imparting relative periodic movement to a pair of kneading surfaces, which are located above a carrying surface, towards and away from each other, i.e., laterally of a trough defined by the kneading surfaces and the carrying surface. As a consequence of this lateral movement of the kneading surfaces, the location at which the pieces of dough contact each of the kneading surfaces will be continuously varied in the vertical direction, which, in conjunction with the continuous peripheral variation of the location of engagement on the pieces of dough themselves, results in a more intensive kneading effect, whereby the rounding operation can be conducted at a higher rate without undue heating effects.

The lateral reciprocating movement of the kneading surfaces can be such that they are alternately moved towards and away from each other. Moreover, the kneading surfaces may be reciprocated in opposite directions longitudinally, as well as laterally, of the trough.

Pieces of dough can be advanced through the trough by moving the carrying surface, on which the pieces of dough intermittently rest. Alternatively, the pieces of dough can be advanced by moving the kneading surfaces at different velocities in the longitudinal direction.

In one embodiment, the present invention includes kneading surfaces formed by rigid plates which are carried by rotating members. Using such kneading plates with a movable or stationary carrying surface results in a dough-rounding machine which is easier and less expensive to manufacture, clean and maintain than the prior art dough-rounding machines, such as the one disclosed in the German patent identified above, employing moving belts.

BRIEF DESCRIPTION OF THE DRAWING

For a more complete understanding of the present invention, reference may be had to the following detailed description taken in conjunction with the accompanying figures of the drawing, in which:

FIG. 1 is a plan view of one embodiment of the invention;

FIG. 2 is a view similar to that of FIG. 1, but showing the movable members in a different relative position.

DESCRIPTION OF AN EXEMPLARY EMBODIMENT

Figure 3:
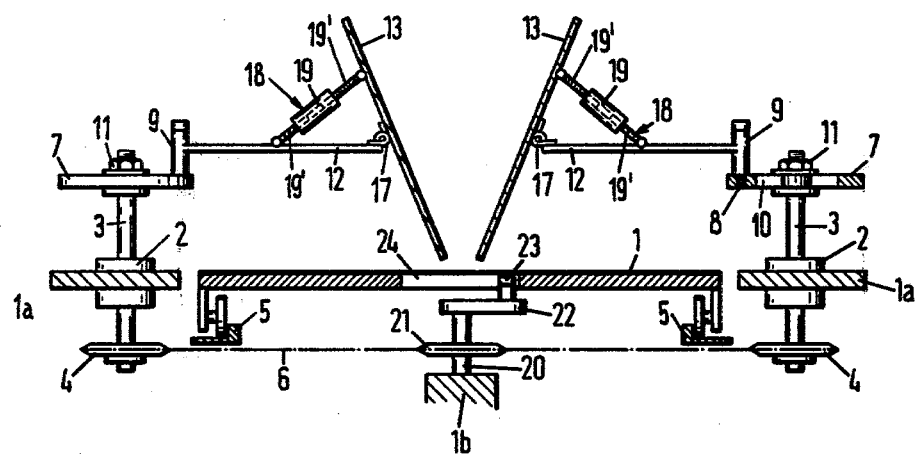
FIG. 3 is a cross-sectional view, taken along the line III—III in FIG. 1 and looking in the direction of the arrows, of the embodiment of FIG. 1.

Referring to FIGS. 1-3, there is shown a dough-rounding machine including a carrying plate 1 mounted for horizontal movement relative to a stationary frame 1a, in which are journalled in bearings 2 (see FIG. 3) four vertical shafts 3. Each shaft 3 has a sprocket wheel 4 mounted thereon. All the sprocket wheels 4 engage a single endless chain 6 driven by a motor (not shown). Secured to the upper end of each shaft 3 is an arm 7, carrying on one end a stud 9 fixed therein with a threaded end 8 (see FIG. 3). Each shaft 3 extends through an elongated slot 10 in a corresponding arm 7, so that the perpendicular distance between each stud 9 and an associated shaft 3 is adjustable. When the distance between each stud 9 and its associated shaft 3 has been adjusted to a desired value, nuts 11 (see FIG. 3) fix the position of the shafts 3 in the slots 10.

Kneading plates 13 are connected to a respective pair of studs 9 by connecting arms 12. One end of each connecting arm 12 is mounted for rotation with respect to a corresponding stud 9, the other end of each connecting arm 12 being pivotally connected, at 17, to an associated kneading plate 13. The angular position of the pair of studs 9 carrying one of the kneading plates 13 with respect to their corresponding shafts 3 is 180° more or 180° less than the angular position of the pair of studs 9 carrying the other kneading plate 13 with respect to their corresponding shafts 3. By this construction, the kneading plates 13 move in opposite longitudinal directions, as indicated by arrows 14 and 15, when the chain 6 travels in the direction indicated by arrow 16. The kneading plates 13 also perform opposite movements towards and away from each other, as a comparison of FIGS. 1 and 2 will show. The reciprocating motion of the kneading plates 13 permits pieces of dough laid therebetween to be rounded in the manner described above.

Between each connecting arm 12 and its corresponding kneading plate 13 there is attached a composite link 18, the length of which may vary to pivot the kneading plates 13 and adjust their angle of inclination. Each link 18 comprises a sleeve 19, the opposite ends of which are internally threaded to receive oppositely threaded link members 19' (see FIG. 3).

In order to transport pieces of dough through the machine, the carrying plate 1 is moved back and forth along a pair of tracks 5, located beneath the kneading plates 13, by a crank mechanism which includes a shaft 20 journalled in a frame element 1b and carrying a sprocket wheel 21. The chain 6 drives the sprocket wheel 21, as well as the sprocket wheels 4 on shafts 3. The shaft 20 has a crank arm 22 mounted on its upper end. A roller 23 is mounted on the free end of the crank arm 22 for longitudinal movement in an elongated slot 24 provided in the carrying plate 1. When the shafts 3 are rotated by the chain 6, the crank arm 22 is driven by the rotation of the shaft 20, thereby moving the carrying plate 1 back and forth in synchronism with the reciprocating movements of the kneading plates 13.

The movement of the carrying plate 1 is such that during the movement of the kneading plates 13 away from each other, resulting in the release of a piece of dough cradled between the kneading plates 13, the carrying plate 1 moves from one end, i.e., the feed end, of the machine to the other end, i.e., the discharge end, thereby advancing the piece of dough resting thereon. During the movement of the kneading plates 13 towards each other, they engage the piece of dough and lift it slightly off of the carrying plate 1. When the piece of dough is cradled between the kneading plates 13 out of contact with the carrying plate 1, the carrying plate 1 moves from the discharge end of the machine back to the feed end.

By repeating this reciprocating movement of the carrying plate 1, pieces of dough can be fed into the machine sequentially for simultaneous rounding or kneading during their incremental advancement through the machine. The increments of advancement can be varied by adjusting the length of the crank arm 22 and/or the diameter of the sprocket wheel 21, so that the residence time of the pieces of dough in the machine can be regulated without interfering with the kneading operation performed by the kneading plates 13.

It will be understood by those skilled in the art that the above-described embodiment is meant to be merely exemplary and that it is susceptible od modification without departing from the spirit and scope of the invention. For example, the crank driven carrying plate 1 can be replaced by a single continuously moving conveyor belt. Also, the pieces of dough can be advanced through the machine without the movable carrying plate 1 or a conveyor belt by making the perpendicular distance of the studs 9 carrying one of the kneading plates 13 from their associated shafts 3 different than the perpendicular distance of the studs 9 carrying the other kneading plate 13 from their associated shafts 3, thereby giving the two kneading plates 13 different velocities. Thus, the invention is not deemed to be limited except as defined in the appended claims.

I claim:

1. In a dough-rounding machine including a carrying surface, a pair of kneading plates located above the carrying surface and diverging upwardly therefrom to form an open ended trough, and driving means for reciprocating the kneading plates in opposite directions laterally and longitudinally of the trough, the improvement wherein the carrying surface is movable in the longitudinal direction of the trough and wherein there are provided means for moving the carrying surface back and forth under the kneading plates in the longitudinal direction, and wherein there are provided means for synchronizing said carrying surface moving means with said kneading plate driving means so that said moving means causes the carrying surface to advance a piece of dough through the trough from one end thereof to the other.

2. The improvement according to claim 1, wherein the driving means for the kneading plates also drives the carrying surface.

3. The improvement according to claim 2, wherein the driving means includes first rotatable crank means for one of the kneading plates; second rotatable crank means for the other kneading plate, said first and second crank means, upon rotation thereof, imparting the reciprocating motion to a respective kneading plate; third rotatable crank means for the carrying surface, said third crank means, upon rotation thereof, imparting the back and forth motion to the carrying surface; and a single endless belt for rotating said first, second and third crank means.

4. The improvement according to claim 3, wherein said third crank means includes a shaft journalled in a stationary frame; a sprocket wheel mounted on said shaft for engagement by said endless belt; a crank arm on said shaft; and a roller extending from said crank arm, at a right angle thereto and parallel with said shaft, through a slot formed in the carrying surface, the slot extending in a direction substantially transversely of the trough.

5. The improvement according to claim 4, wherein each of said first and second crank means includes a shaft journalled in a stationary frame; a sprocket wheel mounted on said shaft for engagement by said endless belt; a crank arm on said shaft; and a connecting rod having one end mounted for rotatable movement about a pivot pin extending from said crank arm at a right angle thereto and parallel with said shaft, the other end of the connecting rod being attached to a respective kneading plate.

6. The improvement according to claim 5, wherein the length of each crank arm of said first, second and third crank means is adjustable.

7. The improvement according to claim 6, wherein the said other end of each crank arm of said first and second crank means is pivotally attached to a respective kneading plate, whereby the angle of inclination of the kneading plates can be varied.

8. The improvement according to claim 1, wherein said means for moving said carrying surface are synchronized with the motion of the kneading plates so that a piece of dough is supported primarily by the carrying surface when the carrying surface moves in a selected forward direction.

9. The improvement as specified in claim 8 wherein said means for moving the carrying surfce is synchronized with the motion of the kneading plates so that a piece of dough is supported primarily by the kneading plates when the carrying surface moves in a direction opposite to said selected direction.

10. In a dough-rounding machine including a carrying surface, a pair of kneading plates located above the carrying surface and diverging upwardly to form an open end trough, and driving means for reciprocating the kneading plates in opposite directions laterally and longitudinally with respect to the trough, the improvement wherein the driving means includes a pair of rotatable crank means, one connected to each of the kneading plates, each of said crank means, upon rotation thereof, imparting said reciprocating motion to its corresponding plate, and a single endless belt is provided for rotating said pair of crank means, and wherein there is further provided means for moving said carrying surface back and forth in a longitudinal direction under the kneading plates with respect to said trough, said means including means for synchronizing motion of said carrying surface with motion of said kneading plates to cause said surface to advance in a selected longitudinal direction with respect to said trough when said plates are separated from each other, thereby to advance dough along said trough.

* * * * *